United States Patent [19]

Preslicka et al.

[11] Patent Number: 4,822,072
[45] Date of Patent: Apr. 18, 1989

[54] SPRING GUARD FOR A VEHICLE SUSPENSION STRUT

[75] Inventors: Alan J. Preslicka, Naperville, Ill.; Guillermo Martinez, Jr., Lambertville, Mich.; James Sommerio, Carol Stream, Ill.

[73] Assignee: Maremont Corporation, Carol Stream, Ill.

[21] Appl. No.: 49,126

[22] Filed: May 12, 1987

[51] Int. Cl.⁴ .............................................. B60G 15/00
[52] U.S. Cl. .................................... 280/668; 280/670
[58] Field of Search ............... 280/666, 668, 696, 701, 280/670

[56] References Cited

U.S. PATENT DOCUMENTS

| | | | |
|---|---|---|---|
| 3,211,444 | 10/1965 | Avner | 280/668 |
| 4,433,856 | 2/1984 | Yoshida | 280/668 |
| 4,545,601 | 10/1985 | Muller et al. | 280/668 |

FOREIGN PATENT DOCUMENTS 2431675  1/1976  Fed. Rep. of Germany ...... 280/668

Primary Examiner—Charles A. Marmor
Assistant Examiner—Ross Weaver
Attorney, Agent, or Firm—McAndrews, Held & Malloy, Ltd.

[57] ABSTRACT

An improved MacPherson strut is disclosed having a guard flange disposed to shield an automobile wheel from contact with a fractured portion of the strut's spring. The flange is configured as an arcuate surface extending from the spring seat to a position between the spring and wheel. The strut also includes a bracket supporting the flange and attaching the flange to the strut body. The bracket is generally planer, and extends radially from the strut body.

8 Claims, 2 Drawing Sheets

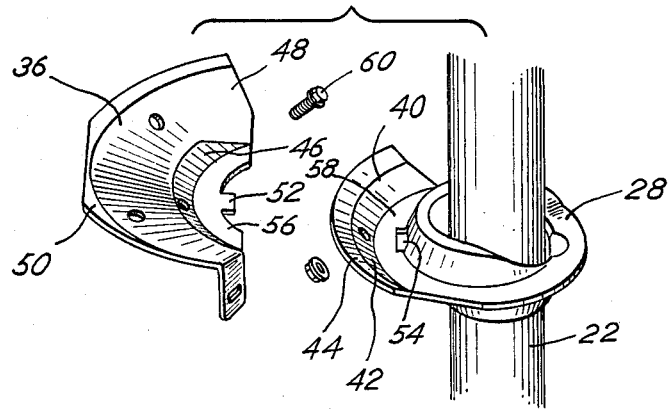
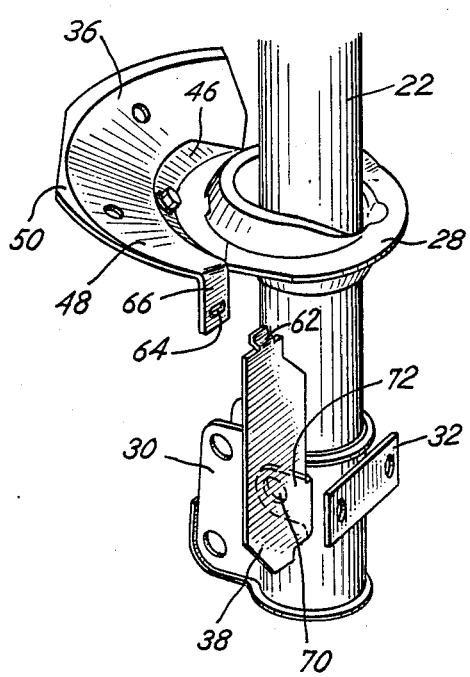
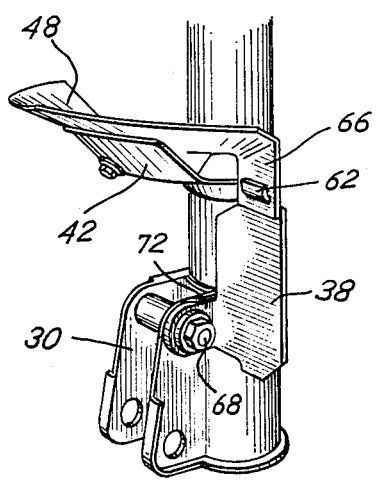

SPRING GUARD FOR A VEHICLE SUSPENSION STRUT

BACKGROUND OF THE INVENTION

This invention relates to passenger vehicle suspension systems, and more particularly it relates to an improved configuration for a MacPherson strut that includes a guard structure adapted to prevent damage that may result when the spring used in such a strut becomes broken.

MacPherson struts have become standard components of passenger vehicle suspensions. The use of MacPherson struts has become more prevalent due to the increased popularity of front wheel drive passenger vehicles, since MacPherson strut configurations are the most common form of suspensions for those vehicle drives. In vehicle suspensions, MacPherson struts commonly locate the front drive axle and serve as the vertical axis for the vehicles wheel assembly. Each MacPherson strut normally includes a piston surrounded by a coil spring. The piston is the suspension's damping element for reducing the oscillatory movement of the wheel. The coil spring is supported on the body (or cylinder) of the piston, and acts to cushion the vehicle body from shocks encountered by the wheel. Together, each piston and coil spring supports approximately 30 to 35 percent of the vehicle body weight and are two of the principle support components for the vehicle body.

The MacPherson strut arrangement necessarily places each piston rod and coil spring assembly in close proximity to the vehicle's wheels. Additionally, the brakelines of passenger vehicles using MacPherson struts are often mounted on a bracket that is attached to the MacPherson strut. Consequently, the brakelines are also close to the strut's coil spring and piston. That proximity of the wheel and brakelines to the strut can lead to safety hazards in the event of a failure of the strut's spring. If, for example, a worn, defective, or overstressed coil spring fractures while the vehicle is operating, the fractured spring in conventional MacPherson strut configurations can contact the vehicle's tire. If the contact is with a sharply broken end of the spring, it can either wear the tire or even cause the fractured spring to tear into and puncture the tire. Similarly, a fractured coil spring can tear or sever a vehicle brakeline, resulting in unexpected loss of at least some braking ability. While most modern vehicles have separate front and rear hydraulic brakes systems so that total braking ability will not be lost, such a spring fracture could nevertheless produce a control problem since the brake failure would probably be combined with an unexpected loss of suspension support and loss of full vehicle control.

The spring fracture problems in conventional struts are compounded by the frequent use of coil springs that have multiple diameters. For example, MacPherson strut springs commonly include both a lesser diameter portion and a greater diameter portion, with a continuous change between diameters. The different diameters produce variable spring constants, and consequently cause the suspension to provide different amounts of support at differing strut loads. Conventionally, the smaller diameter portion of the spring is located at the spring's bottom. It is usually attached to the strut by resting on a relatively small diameter spring seat that is constructed of a disk mounted around the strut's cylinder. When spring fracture occurs, the larger diameter portion of the spring is often of a diameter larger than the spring seat, so that the larger diameter coils of the spring can fall beneath the spring seat to a position around the lower portion of the strut. Since passenger vehicle brakelines are conventionally mounted on the strut near the strut's bottom, the probability of brakeline damage upon spring failure is greater when such variable diameter springs are used.

Regardless of the diameter of the spring, and regardless of the size of the spring seat, a fractured spring can often still move to the lower portion of the MacPherson strut by "corkscrewing" around that strut and winding downward to beneath the spring seat. Again, the fractured spring then produces a hazard not only to the wheel's tire but to the vehicle's front braklines as well, with potentially dangerous damage resulting.

OBJECTS OF THE INVENTION

Accordingly, it is an object of this invention to provide a structure for protecting against damage to tires or other vehicle components that can result from a broken or fractured spring in a MacPherson strut.

Another object of this invention is to provide a structure capable of protecting against damage from a fractured MacPherson strut spring when the spring is constructed of multiple diameters.

Yet another object of this invention is to provide a MacPherson strut with a structure for protecting tires and brakelines from damage from a broken spring.

Still another object of this invention is to provide a structure that prevents a broken MacPherson strut spring from winding downwardly around the lower part of the MacPherson strut.

Still a further object of this invention is to provide an easy-to-manufacture structure for protecting against damage from a broken MacPherson strut spring.

Yet a further object of this invention is to provide a MacPherson strut spring protection device that is easy to install and is adaptable for use on a variety of different MacPherson strut configurations.

Still another object of this invention is to provide a MacPherson strut spring protection device that is easy to package for sale with the strut.

SUMMARY OF THE INVENTION

These and other objects of the invention are accomplished by providing a guard flange that is attachable to the spring seat of a MacPherson strut. The guard flange is disposed to shield an automobile wheel from contact with a broken portion of the spring. The flange is configured as an arcuate surface extending from the spring seat to a position between the spring and the wheel. The MacPherson strut also comprises a bracket supporting the guard flange and attaching the flange to the strut body. The bracket is configured as a generally planer surface extending radially from the strut body.

BRIEF DESCRIPTION OF THE DRAWINGS

The drawings include six figures to illustrate the preferred embodiment of the invention, wherein like reference numerals in each drawing refer to like parts of the illustrated structure. The drawings are briefly described as follows:

FIG. 3 is an exploded perspective view of the spring guard structure of this invention, illustrating attachment of the guard flange to a spring seat.

FIG. 4 is a exploded perspective of the invention showing attachment of the bracket to the guard flange.

FIG. 5 is a perspective view illustrating the underside of the guard flange and its attachement to the spring seat, and further illustrating the connection of the bracket to the strut body.

In the detailed description, directional terms such as upper, lower, upwardly, downwardly and the like are used to relate the invention to the generally vertical orientation of a MacPherson strut installed conventionally in a passenger automobile. Terms of this type are used for the convenience of the person of ordinary skill in the art, and are not intended to limit the scope of any patent issuing on the present invention, unless expressly included in the claims.

DETAILED DESCRIPTION OF THE PREFERRED EMBODIMENT

The present invention is a structure that protects against damage from a broken automobile spring on a MacPherson strut. Generally, the preferred embodiment comprises an arcuate guard flange extending from the MacPherson strut's spring seat to a position between the spring and the vehicle wheel. The preferred embodiment also includes a bracket supporting the flange and configured to limit downwardly winding of a broken spring about the strut. The spring seat of the MacPherson strut is adapted to be mateable with the arcuate flange.

Figure 1:
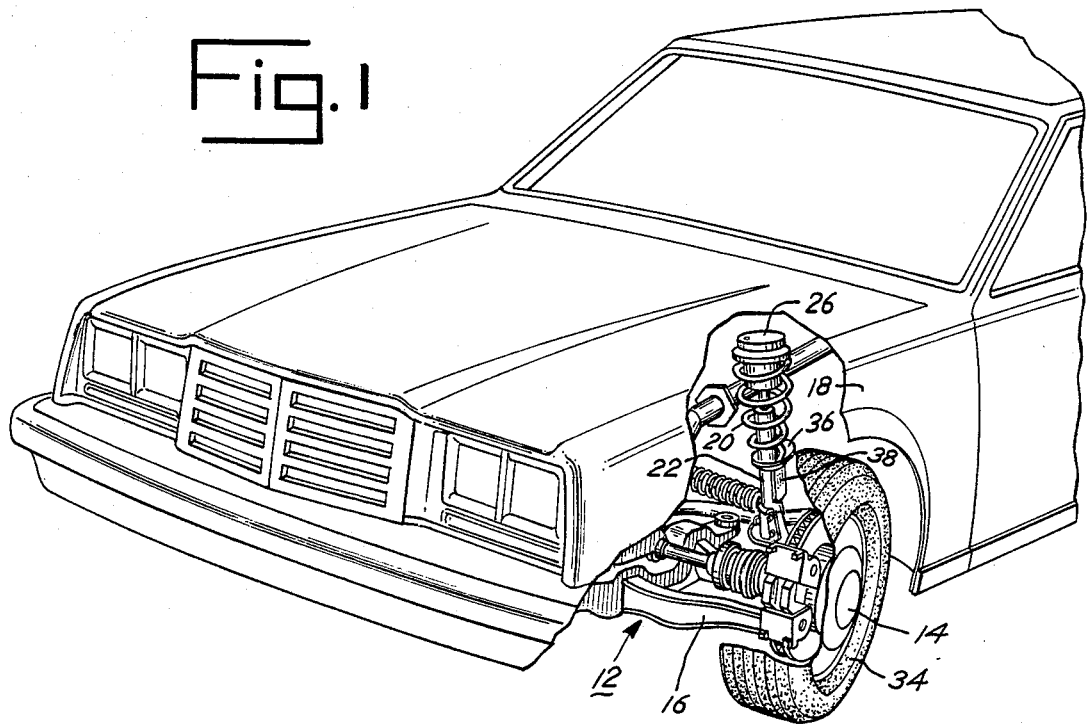
FIG. 1 is a cut-away perspective view of an automobile having a MacPherson strut with the preferred embodiment of the guard flange attached.
Figure 2:
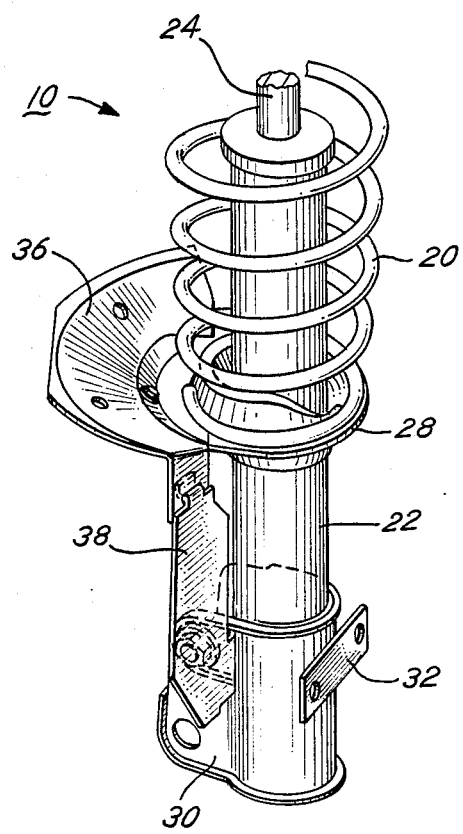
FIG. 2 is a front perspective view showing the guard flange and bracket mounted on the spring seat and a body of a MacPherson strut.

Referring now to FIGS. 1 and 2 of the accompanying drawings, the preferred embodiment of the present invention is incorporated on a MacPherson strut assembly 10. The assembly is part of a vehicle suspension 12 and is adapted to connect between a wheel 14, mounted on both the vehicle chassis 16 and the vehicle body 18. The invention is adapted for use with a conventional MacPherson strut having a spring 20, a cylinder 22 and a piston 24. The body 18 is supported on the strut assembly 10 by a strut cap 16, which combines the resistance of the piston 24 and the spring 20 to support the body and dampen the transmission of shocks from the wheel to the automobile body and passenger compartment.

As is conventional in MacPherson struts, the strut includes a spring seat 28 that supports the spring. The strut also includes a strut mounting bracket 30 to connect the strut to the vehicle's chassis. As is also often the case with MacPherson struts, the construction includes a conventional brakeline bracket 32 adapted to support the brakelines containing the hydraulic brake fluid.

To protect the tire 34 from damage from a broken spring, the assembly 10 includes an arcuate guard flange 36 attached to the assembly and disposed between the lower portion of the spring 20 and the tire 34. In the preferred embodiment, the guard flange 36 attaches to the assembly by connecting to the spring seat 28. The assembly also includes a depending support bracket 38 that is attached to both the guard flange and the strut cylinder. In the preferred embodiment, the support bracket 38 attaches to the cylinder by connection to the strut mounting bracket 30.

Referring now to FIGS. 3-5, the details of the arcuate flange and support bracket and the preferred embodiment of the connection between those elements and the remainder of the strut assembly are illustrated. In the preferred embodiment, the spring seat 28 includes an enlarged portion 40. Preferably, the enlarged portion is arcuate in configuration. Moreover, the arcuate shape of the arcuate guard flange 36 preferably matches that of the enlarged portion 40. Also in the preferred embodiment, both the spring seat spring seat enlarged portion and the arcuate flange 36 define multiple arcuate surfaces; the spring seat enlarged portion has a lower segment 42, and shallow portion 44 serving as a rim around the lower segment. The arcuate guard flange 36 correspondingly has a lower segment 46 corresponding in shape to the spring seat lower segment 42, and the guard flange has a shield portion 48 corresponding to the shallow portion 44 of the spring seat. Additionally, the preferred embodiment of the invention includes a third surface on the guard flange defining a rim 50. The multiple surfaces serve to increase the ultimate strength of the assembled configurations, and allow for a more secure attachment of the guard flange to the spring seat.

In the preferred embodiment, the guard flange 36 is attached to the spring seat 28 through use of a tab 52 that is constructed as an integral part of the guard flange; the tab mates with an opening or slot 54 in the spring seat. The flat portion 56 of the guard flange then rests securely against the flat portion 58 of the spring seat. As a result, guard flange 36 is able to be firmly affixed to the spring seat 28 with a bolt 60.

As described above, the preferred embodiment of the invention also includes a support bracket 38. That support bracket rigidly secures the guard flange 36 to the spring seat and strut body by providing an additional anchor point for the flange. In the preferred embodiment, the support bracket 38 is generally planer and extends both downwardly along the strut and radially out from the cylinder 22. The support bracket includes a connecting tab 62 corresponding to an opening 64 in a depending end 66 of the arcuate guard flange 36. The support bracket is secured to the strut mounting bracket 30, at the time of installation by mounting bolt 68 inserted through an opening 70 in a support arm 72 of the bracket 38. By using the described arrangement, the support bracket 38, arcuate flange 36, and spring seat 28 are all securely connected as a single rigid unit.

When configured as described, the preferred embodiment of the invention acts to protect the vehicle's tire and brakelines in the event of a fracture of the spring 20. The tire is protected by the shield portion 48 and rim 50 of the guard flange, since those shield portions extend between the lower end of the spring 20 and the tire 34. Likewise, the guard flange 36 enlarges the effective size of the spring seat 28, thereby helping to prevent a broken spring from falling downward to the lower part of the assembly; contact and potential damage to the hydraulic brakeline when the brakeline is mounted on the brakeline bracket 32 is thereby made less likely.

Independent of protection offered by the enlarged size of the arcuate flange, additional protection against damage to the brakeline is provided by the preferred configuration of the support bracket 38. By having a lengthy planer surface extending radially from the cylinder 22, the support bracket 38 severely limits "corkscrewing" or winding of a broken spring 20 downwardly around the cylinder 22. This configuration is particularly appropriate in view of the frequent passenger vehicle use of variable diameter springs on conventional MacPherson struts and the ability of the larger diameter coils of such a spring to slip over the lesser outside diameter of the spring seat 28 on the side of the seat that is away from the flange 36. Thus, even when broken elements of the spring slip over or wind under a portin of the spring seat, the support bracket 38 prevents those elements from extending further downward since all winding below the spring seat is prevented.

As constructed, the particular configuration of the preferred embodiment of both the arcuate guard flange and support bracket adapt the assembly to easy manufacture and economical packaging for sale. The guard flange and support bracket can each be constructed in individual stampings, each occurring in a single stamping operation. Moreover, the preferred embodiment incorporates an assembly of parts rather than a large preassembled unit. The guard flange and support bracket can therefore be contained within the same sales packaging that will be used for the remainder of the strut assembly, without increasing the size of the strut assembly packaging thereby minimizing both shipping and storage volumes. Accordingly, a desirable safety feature can be added to a conventional MacPherson strut with a minimum of cost, and few additional manufacturing or packaging operations.

While the preferred embodiment of the present invention has been set forth in the above detailed description, it is to be understood that the invention is limited only by the following claims and their equivalents.

What is claimed is:

1. A structure for protecting against damage from a broken automobile suspension spring of the kind adapted for use with a MacPherson strut having a strut body and mounted in the vicinity of an automobile tire, with the structure further adapted to be secured about the strut on a spring seat attached to the strut, the structure comprising:

a guard flange attached to the spring seat and disposed to shield the tire from contact with a broken spring and further comprising a bracket supporting the guard flange and attaching the guard flange to the strut body.

2. A structure as claimed in claim 1, wherein a spring surrounds a portion of the strut body and the guard flange is configured as an accurate surface, separate from the strut body and, extending from the spring seat to a position between the spring and the tire.

3. A structure as claimed in claim 1, wherein the bracket is configured as a surface extending radially from the strut body.

4. A structure as claimed in claim 3, wherein the bracket is generally planar.

5. A structure as claimed in claim 1, wherein the bracket is affixed to the strut body and the guard flange is attached to the bracket by the tongue and groove arrangement.

6. A structure as claimed in claim 1, wherein the strut includes a means for securing the strut to an axle, and the bracket is attached to that means.

7. A structure as claimed in claim 2, wherein the flange comprises concentric conical guard surfaces extending around a portion of the strut body.

8. A structure as claimed in claim 1, wherein the spring seat and flange comprise matching conical surfaces, and the flange is attached to the spring seat by securing the matching surfaces in contact.

* * * * *